(12) United States Patent
Falkenborg

(10) Patent No.: US 8,671,747 B1
(45) Date of Patent: Mar. 18, 2014

(54) TPMS MONITOR MOUNTING BRACKET

(76) Inventor: William C. Falkenborg, Tujunga, CA (US)

( * ) Notice: Subject to any disclaimer, the term of this patent is extended or adjusted under 35 U.S.C. 154(b) by 277 days.

(21) Appl. No.: 13/373,597

(22) Filed: Nov. 21, 2011

(51) Int. Cl.
 *B60C 23/00* (2006.01)
(52) U.S. Cl.
 USPC ......................................... 73/146.8
(58) Field of Classification Search
 USPC .............................. 73/146–146.8
 See application file for complete search history.

(56) References Cited

U.S. PATENT DOCUMENTS

| | | | |
|---|---|---|---|
| 4,455,716 A | 6/1984 | Leonardo | |
| 5,774,048 A | 6/1998 | Achterholt | |
| 5,987,980 A | 11/1999 | Mangafas et al. | |
| 6,005,480 A | 12/1999 | Banzhof et al. | |
| 6,612,528 B2 | 9/2003 | Collins et al. | |
| 6,662,665 B1 * | 12/2003 | Huang | 73/756 |
| 6,729,101 B2 | 5/2004 | Macri | |
| 6,799,455 B1 | 10/2004 | Neefeldt et al. | |
| 7,021,133 B1 * | 4/2006 | Hsu | 73/146.8 |
| 7,178,390 B1 * | 2/2007 | Kalovsky et al. | 73/146 |
| 2004/0163456 A1 * | 8/2004 | Saheki et al. | 73/146.8 |
| 2007/0062268 A1 * | 3/2007 | Blossfeld et al. | 73/146.8 |
| 2008/0173082 A1 * | 7/2008 | Hettle et al. | 73/146.5 |
| 2009/0266153 A1 * | 10/2009 | Hironaka | 73/146.5 |

* cited by examiner

*Primary Examiner* — Andre Allen
(74) *Attorney, Agent, or Firm* — Albert O. Cota

(57) ABSTRACT

A TPMS monitor mounting bracket consisting of a flat square base having a centrally located clearance hole therein. The bracket includes an upward-extending S-shaped angular arm that is integral with the base. The bracket also includes a first flat mounting surface located on the same horizontal plane above the square base, and includes a centered first tapped hole. An upward-extending inverted V-shaped angular arm having a second flat mounting surface integral with and positioned essentially 87-degrees from the square base, and having an centered second tapped hole therein. A hollow screw is disposed within the square base clearance hole for attachment to a tire inflation valve, and a threaded screw engages the S-shaped angular arm tapped hole for attachment of a TPMS monitor into a steel or aluminum wheel.

17 Claims, 4 Drawing Sheets

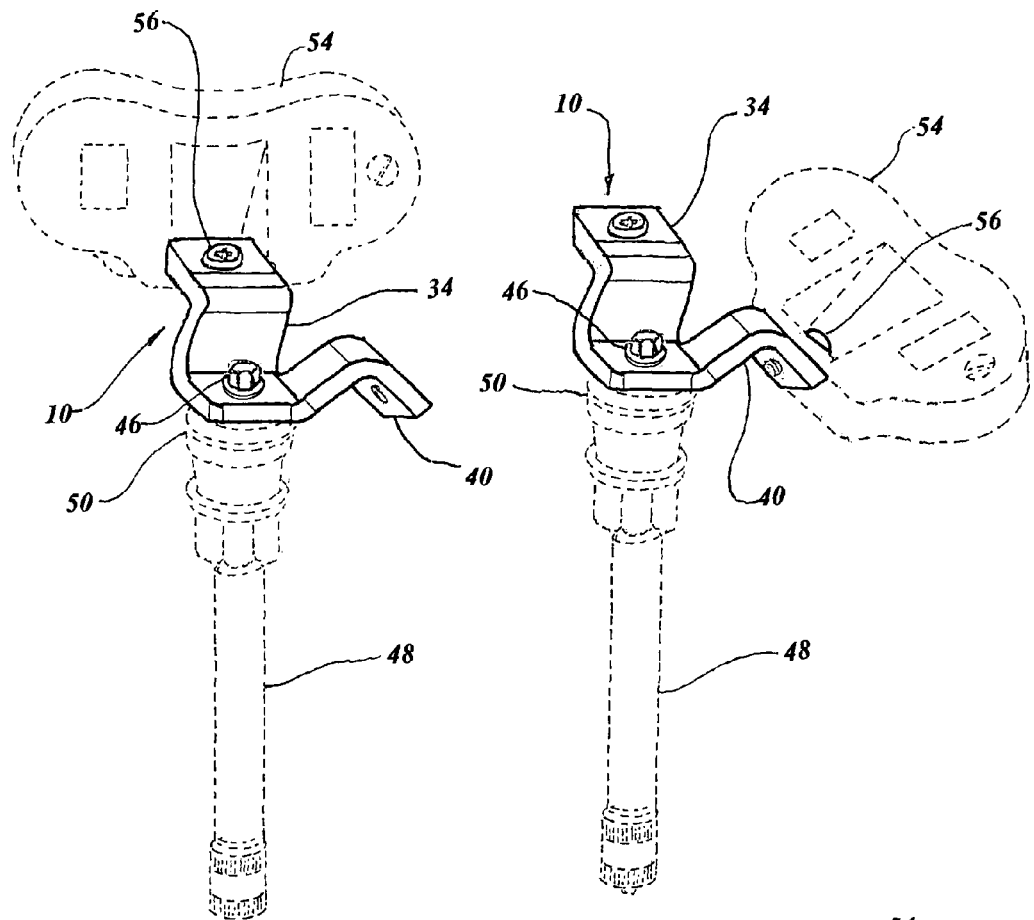
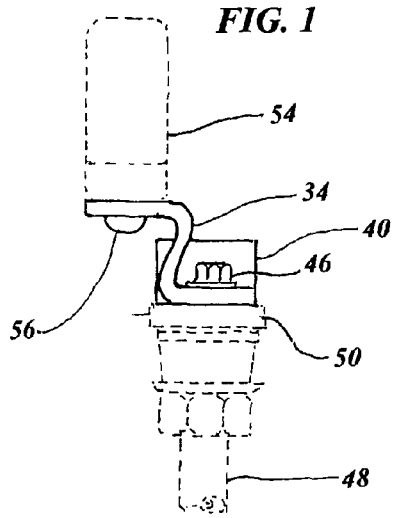
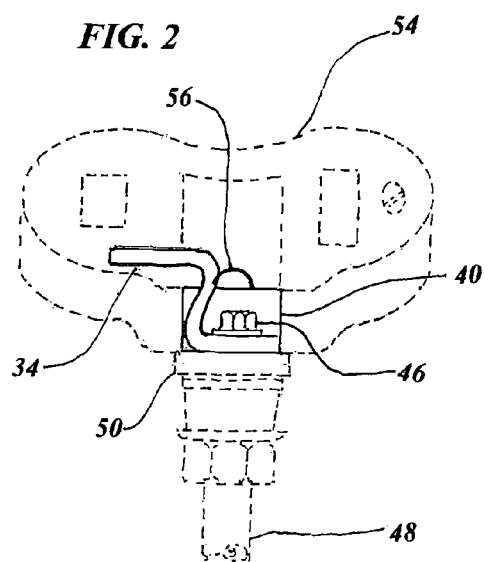
FIG. 1  FIG. 2  FIG. 3  FIG. 4

TPMS MONITOR MOUNTING BRACKET

TECHNICAL FIELD

The invention generally pertains to mounting brackets, and more specifically, to a mounting bracket that permits attachment of a Tire Pressure Monitoring System (TPMS) to a tire inflation valve located on an aluminum or steel vehicle wheel.

BACKGROUND ART

In the past, whenever a person wanted to determine the pressure within a vehicle tire a hand-held gauge as utilized. The person would have to remove each tire's valve stem cover and manually place the gauge on the tire's valve stem. The gauge would then indicate the tire pressure which was typically displayed on a strip of metal that extended outward from the gauge.

As technology has improved vehicle manufacturers have developed automatic tire pressure monitoring systems (TPMS) which are now common on many vehicles. The systems provide a driver of a vehicle with a visual indicator when the tire pressure is too low or too high.

There are problems associated with TPMS, though. One problem arises from the difficulty of mounting a TPMS on certain types of vehicle wheels. As a result of the design of some wheels, such as special size aluminum and steel truck wheels, or duplex super single wheels, it is difficult to adequately and efficiently mount a TPMS monitor on the wheel.

What is needed is a mounting bracket or adapter that will provide the required attachment means for a TPMS monitor to an aluminum or steel truck wheel or duplex super single wheel. In the interest of economy, a single bracket or adapter that can be utilized for all three types of wheels would be optimal.

The prior art listed below did not disclose any literature or patents that possess the novelty of the instant invention, however the following U.S. patents are considered related:

| Pat. No. | Inventor | Issue Date |
| --- | --- | --- |
| 4,455,716 | Leonardo | Jun. 26, 1984 |
| 5,774,048 | Achterholt | Jun. 30, 1998 |
| 5,987,980 | Mangafas et al. | Nov. 23, 1999 |
| 6,005,480 | Banzhof et al. | Dec. 21, 1999 |
| U.S. Pat. No. 6,612,528 B2 | Collins et al. | Sep. 2, 2003 |
| U.S. Pat. No. 6,799,455 B1 | Neefeldt et al. | Oct. 5, 2004 |

U.S. Pat. No. 4,455,716 issued to Leonardo is for a tap bracket or unitary cable clamp for connection to an overhead suspension cable of messenger wire. The bracket comprises two edge panels integrally connected by a single bend establishing an initially acute angle between the edge panels. Each panel has an elongated flange that is bent inward towards the opposite edge panel, thereby forming a space between the flanges.

Achterholt in U.S. Pat. No. 5,774,048 discloses a valve which generates a signal indicating a pressure drop in a vehicle tire. A pressure sensor and microprocessor are provided which store a value of the pressure in memory and compares pressure, sending a signal periodically.

Mangafas et al. in U.S. Pat. No. 5,987,980 teaches a tire valve having a pressure sensor and transponder. The sensing device is removable from a valve stem. The device is electrically connected to a conductive portion of the valve element via a receptacle to facilitate an antenna system for radio frequency communication with the device.

U.S. Pat. No. 6,005,480 issued to Banzhof et al. is for a tire pressure radio-frequency sending unit mounted to a snap-in resilient valve body with a column extending from the sending unit. The column defines a central passageway to facilitate insertion using standard insertion tools. In one version, two batteries are included in the sending unit that are disposed on opposite edges of the column.

U.S. Pat. No. 6,612,528 B2 issued to Collins et al teaches a compound mounting bracket for attaching a solenoid to a structure. The bracket has a first and second plate each having a first edge and a second distal edge. The second edge of the first plate is connectable to a first mounting point on a solenoid. The second distal edge of the second plate extends in a direction generally transverse to the first edge of the second plate, thereby defining a dihedral angle between the first plate and the second plate.

Neefeldt et al. in U.S. Pat. No. 6,799,455 B1 disclose a tire pressure monitor that continuously indicates a tire is adequately inflated for safe operation. The monitor includes an indicator that is utilized for each tire indicating which tire is operational. The monitor includes a battery-operated pressure-sensitive radio frequency transmitter mounted on the outer end of a conventional tire valve stem and includes an antenna extending into each tire for transmitting a signal. The signal transmitted on each tire valve actuates the indicator associated with a signal from only the transmitter assigned to each tire.

For background purposes and as indicative of the art to which the invention is related reference may be made to the remaining cited patent issued Macri in U.S. Pat. No. 6,729,101 B2.

DISCLOSURE OF THE INVENTION

The primary object of the invention is the creation of a new and novel mounting bracket that permits attachment of a Tire Pressure Monitoring System (TPMS) to a tire inflation valve located on a vehicle wheel. There are a numerous similar methods of attachment, as there are no standardized methods of interface connection. The invention allows the same bracket to be used for 22.5 inch diameter vehicle wheels, as two different mounting angles are required for the particular material of the wheel.

An important object of the invention is that it is specifically designed for use with aluminum vehicle wheels having an S-shaped angular arm, and with steel vehicle wheels having an inverted V-shaped angular arm, with each arm positioning the monitor in an optimum location.

Still another object of the invention permits the use of a TPMS with a 14 inch duplex super single vehicle wheel that utilizes the same basic bracket only with a third arm added, which is configured at right angles to mount the TPMS away from the bracket's square base. The bracket is easily formed with the same tooling as used with the preferred embodiment, only with the addition of the third arm for the second embodiment.

Another object of the invention incorporates an angled arm to precisely fit either an aluminum or steel wheels thereby permitting the TPMS to be positioned away from the vehicle wheel to prevent contact due to road vibration and shock.

Yet another object of the invention includes a self-tapping hollow screw that allows air to pass through the tire inflation valve and to tap into the existing hole in the valve without any other modification to the valve itself. An appropriate size and thread arrangement is selected to accommodate the particular style, length and bore diameter of the manufacture's valve.

A further object of the invention includes a threaded screw that interfaces with a threaded hole in the arm of the bracket which may be either furnished with the mounting bracket, or supplied by the manufacturer along with the TPMS.

A final object of the invention is that it is easy to produce with inexpensive tooling such as a steel rule die, along with well known mechanical tools, such as a press for the die, a drill press for threading, and a conventional press brake for forming the arms, all of which are readily available and used in conventional manufacturing.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the monitor mounting bracket with a tire inflation valve mounted to the bracket square base and the TPMS monitor mounted to the S-shaped angular arm, with the valve and monitor shown in dashed lines in the preferred embodiment of the mounting bracket.

FIG. 2 is a partial isometric view of the monitor mounting bracket with a tire inflation valve mounted to the bracket square base and the TPMS monitor mounted to the inverted V-shaped angular arm, with the valve and monitor shown in dashed lines in the preferred embodiment of the mounting bracket.

FIG. 3 is a partial top plan view of the preferred embodiment with the monitor mounted on the S-shaped angular arm.

FIG. 4 is a partial top plan view of the preferred embodiment with the monitor mounted on the inverted V-shaped angular arm.

BEST MODE FOR CARRYING OUT THE INVENTION

Figure 5:
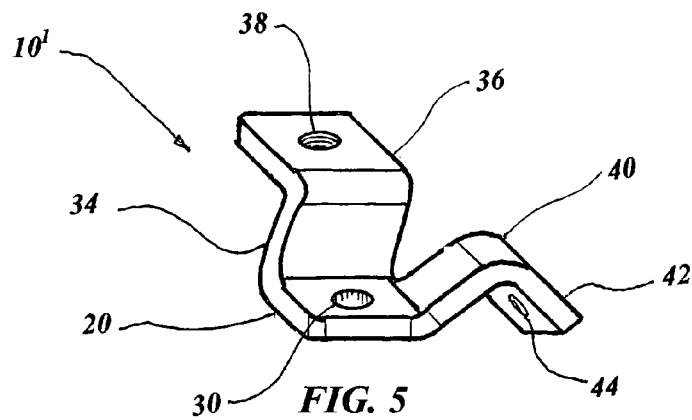
FIG. 5 is an isometric view of the monitor mounting bracket in the preferred embodiment.

The best mode for carrying out the invention is presented in terms that disclose a preferred and a second embodiment of a TPMS monitor mounting bracket. The preferred embodiment, as shown in FIG. 1 through 10, is comprised of a flat square base 20, a first edge 22, a second edge 24, a third edge 26 and a fourth edge 28. The flat square base 20 incorporates a centrally located clearance hole 30, as shown in FIGS. 5 and 8. The flat square base, designated $A_1$ in FIG. 8, is at least 0.625 inches (1.59 cm) square, and includes a radial corner 32 at the intersection of the third edge 26 and the fourth edge 28.

Figure 17:
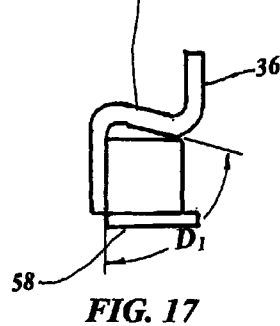
FIG. 17 is a left side view of the monitor mounting bracket in the second embodiment.
Figure 18:
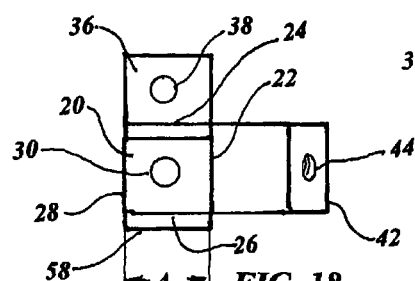
FIG. 18 is a plan view of the monitor mounting bracket in the second embodiment.
Figure 19:
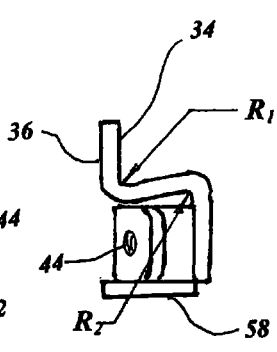
FIG. 19 is a right side view of the monitor mounting bracket in the second embodiment.

The first edge 22 of the square base 20 has an integral upward-extending S-shaped angular arm 34 with a first flat mounting surface 36 on the same horizontal plane, but positioned above the square base 20. The S-shaped angular arm 34 includes a centered first tapped hole 38, as illustrated in FIGS. 5 and 8, that is located between the square base first edge 22 and the first flat mounting surface 36. The arm 34 has a radius, designated $R_1$ in FIGS. 9 and 19, of essentially 0.09 inches (0.24 cm) from the square base first edge 22 to the arm 34. The arm 34 also a similar radius of essentially 0.09 inches (0.24 cm), designated $R_2$ in FIGS. 9 and 19, from the arm 34 to the first flat mounting surface 36. The upward-extending S-shaped angular arm 34 further has an offset angle of essentially 71 degrees, designated $D_1$ in FIGS. 7 and 17, between the square base 20 and the S-shaped angular arm 34.

Figure 6:
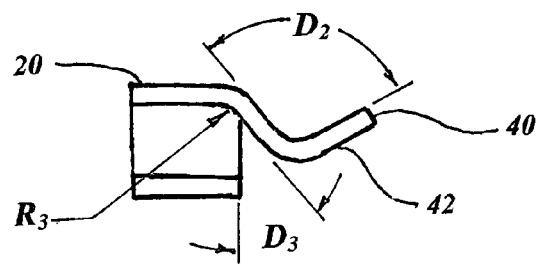
FIG. 6 is a front view of the monitor mounting bracket in the preferred embodiment.
Figures 7, 8, 9:
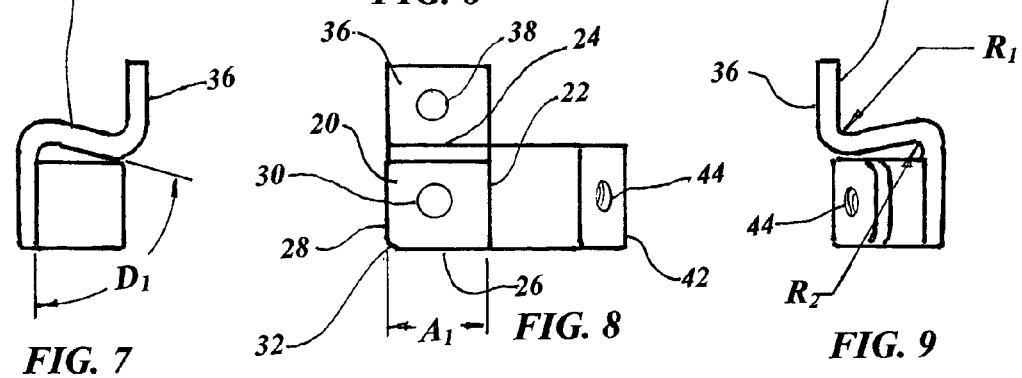
FIG. 7 is a left side view of the monitor mounting bracket in the preferred embodiment.
FIG. 8 is a plan view of the monitor mounting bracket in the preferred embodiment.
FIG. 9 is a right side view of the monitor mounting bracket in the preferred embodiment.
Figures 10, 11, 12:
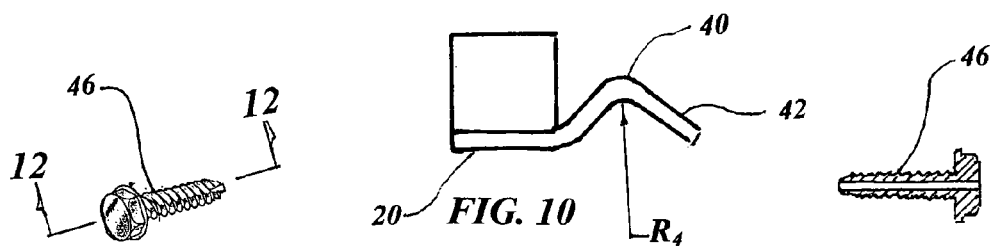
FIG. 10 is a rear view of the monitor mounting bracket in the preferred embodiment.
FIG. 11 is a partial isometric view of a hollow screw completely removed from the invention for clarity.
FIG. 12 is a cross-sectional view taken along lines 12-12 of FIG. 11.
Figures 13, 14:
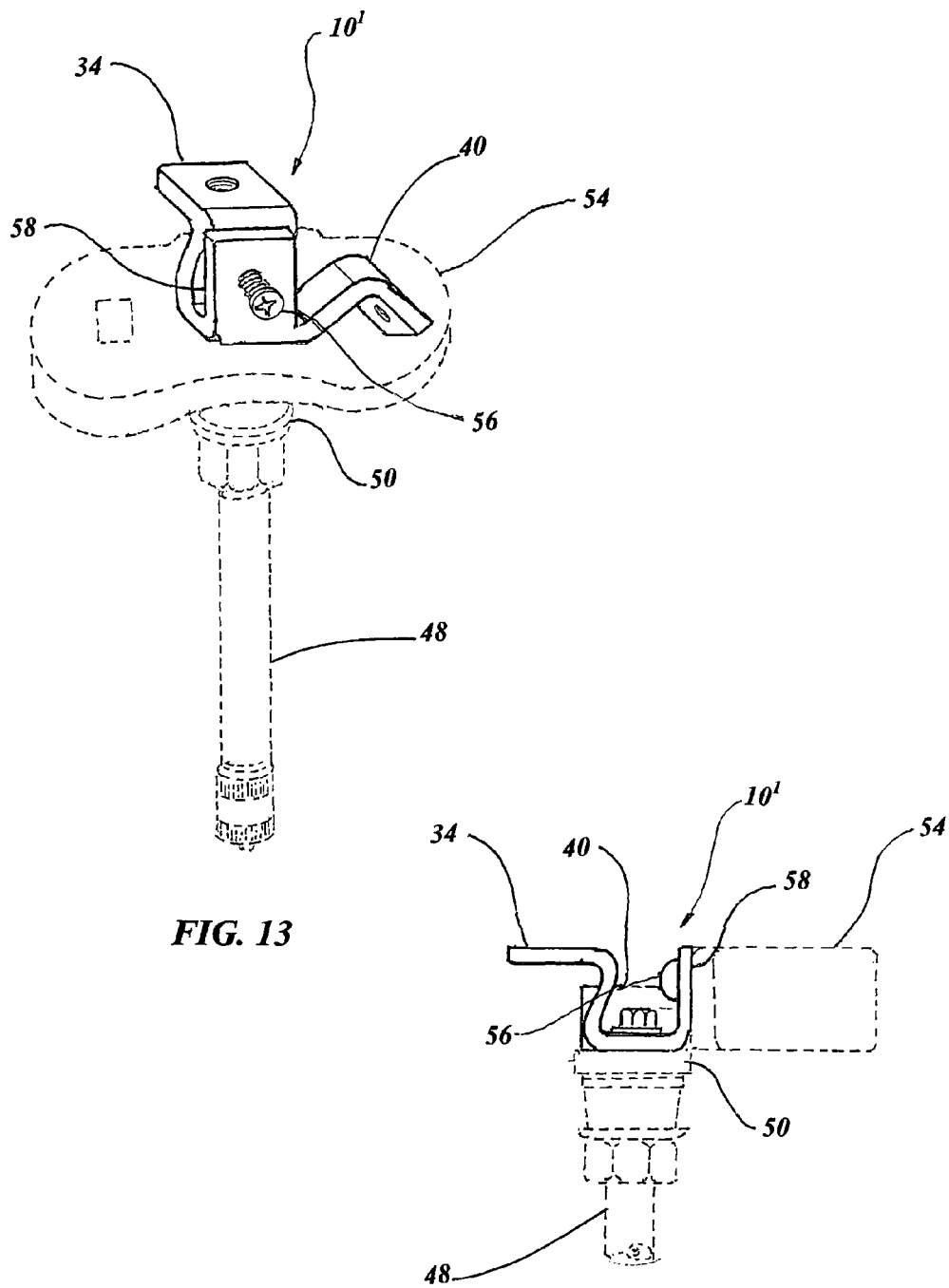
FIG. 13 is a partial isometric view of the monitor mounting bracket with a tire inflation valve mounted to the bracket square base and the TPMS monitor mounted to the integral right angle arm, with the valve and monitor shown in dashed lines in the second embodiment of the mounting bracket.
FIG. 14 is a partial top plan view of the second embodiment with the monitor mounted on the integral right angle arm.
Figure 15:
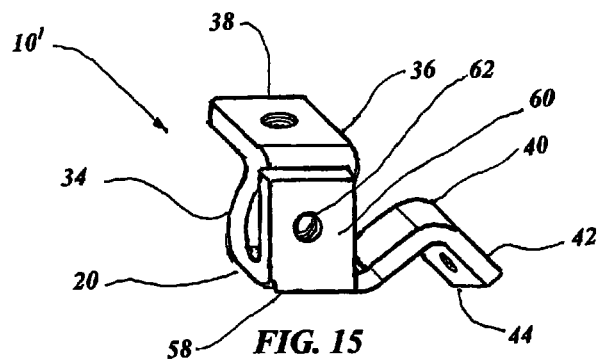
FIG. 15 is an isometric view of the monitor mounting bracket in the second embodiment.
Figure 16:
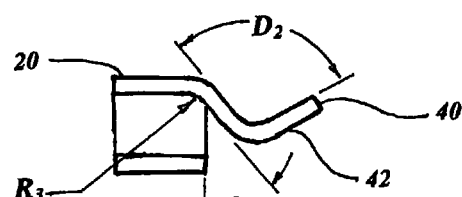
FIG. 16 is a front view of the monitor mounting bracket in the second embodiment.
Figure 20:
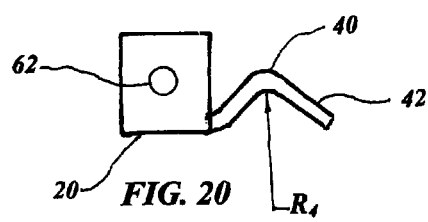
FIG. 20 is a rear view of the monitor mounting bracket in the second embodiment.

The second edge 24 of the square base 20 has an integral upward-extending inverted V-shaped angular arm 40 having a second flat mounting surface 42 that is essentially 87 degrees, designated $D_2$ in FIGS. 6 and 16, from the square base 20. The arm 40 includes an essentially centered second tapped hole 44, as shown in FIGS. 5, 8, 15 and 18. The V-shaped angular arm 40 has a radius, designated $R_3$ in FIGS. 6 and 16, of essentially 0.30 inches (0.08 cm) from the square base second edge 24 to the V-shaped angular arm second flat mounting surface 42. The same V-shaped angular arm 40 has a radius of essentially 0.16 inches (0.41 cm), designated $R_4$ in FIGS. 10 and 20, from the square base second edge 24 to the second flat mounting surface 42. The V-shaped angular arm second flat mounting surface 42 is formed essentially 41 degrees from the square base second edge 24 to the V-shaped angular arm 40, as designated $D_3$ in FIGS. 6 and 16.

The entire bracket including the flat square base 20, integral upward-extending S-shaped angular arm 34 and the upward-extending inverted V-shaped angular arm 40 is made of a metallic material, such as aluminum, steel, brass, copper, titanium or even a high strength polymer. It has been found however that aluminum having a nominal thickness of 0.125 inch, such as grade 5052 with a H32 temper hardness, has proven ideal and therefore is preferred.

A hollow self-tapping screw 46 is inserted into the square base clearance hole 30 and threaded into the bore of a conventional tire inflation valve 48 on its distal mounting flange 50, as shown in FIGS. 1-4, 13 and 14 (the tire inflation valve 48 is shown in dashed lines as it is not part of the invention). The hollow self-tapping screw 46 allows air to pass through the tire inflation valve 48 and the mounting bracket 10 into the tubeless tire of a vehicle. Since there is no industry standard for the inside diameter of the tire inflation valve 48, an appropriate diameter and thread arrangement of the hollow self-tapping screw 46 is selected to accommodate the particular style, length and design arrangement of the manufacture's valve 48. The threads of the hollow self-tapping screw 46 may be SAE fine, coarse or even metric, as long as sufficient material is provided in the valve mounting flange 50 to engage the threads of the hollow self-tapping screw 46. The head style of the screw 46 may be of any appropriate type, however a hex head type is preferred. It is understood that the self-tapping screw also includes the thread cutting type and is made of a material including a variety of steels such as stainless and high strength. The hollow in the screw 46 may be any diameter, however 0.058 inches (1.47 mm) has proven to be adequate.

The bracket 10 mounts a tire pressure monitor 54, (shown in dashed lines as it is not part of the invention), with a threaded screw 56 that engages the angular arm tapped hole, either 38 or 44, depending on the wheel used. The threaded screw 56 may either be furnished as an element with the mounting bracket 10, or supplied by a manufacturer along with the tire pressure monitor 54. The tapped holes 38 and 44 are selected in configuration to mate with the threaded screw of the tire pressure monitor 54 or, if supplied as an element, an ASA #10-32 machine screw is preferred with matching tapped holes 38 and 44.

The preferred embodiment of the TPMS monitor mounting bracket 10 may be used with a 22.5 inch steel vehicle wheel utilizing the S-shaped angular arm 34 as the attachment point for the tire pressure monitor 54, as illustrated in FIGS. 1 and 3. For aluminum wheels the tire pressure monitor 54 is mounted on the inverted V-shaped angular arm 40, as illustrated in FIGS. 2 and 4, thus permitting the bracket 10 to have a dual purpose.

The second embodiment is the same as the preferred embodiment described above, except for the addition of a third arm which is for attachment of the monitor 54 used in conjunction with a 14 inch duplex super single vehicle wheel. Since the remainder of the bracket 10 and the tire inflation valve 48 are exactly the same, the designation numbers and descriptions are used in both embodiments.

The second embodiment of the mounting bracket, designated 10', is illustrated in FIGS. 15-20 with the flat square base third edge 26 having an integral right angle arm 58 with a third flat mounting surface 60 at a right angle from the square base 20. The third flat mounting surface 60 also has an essentially centered third tapped hole 62 therethrough. The integral right angle arm 58 has a minimum bend radius of at least 0.09 inches from the square base third edge 26 to the third flat mounting surface 62, designated $R_5$ in FIG. 19. The arm is formed essentially 90 degrees from the square base third edge 26 to the third flat mounting surface 62, designated $D_3$ in FIG. 17.

It should be understood that the second embodiment bracket 10¹ could be used as a universal bracket with any of the three vehicle wheels described above, or the second embodiment bracket could be simplified to a straightforward angle bracket with only one upstanding 90 degree leg.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A tire pressure monitoring system (TPMS) monitor mounting bracket which comprises:
   a) a flat square base having a first edge, a second edge, a third edge and a fourth edge, with said square base having a centrally located clearance hole therein,
   b) said first edge having an integral upward-extending S-shaped angular arm with a first flat mounting surface on the same horizontal plane that is located above said square base, and said first flat mounting surface having a centered first tapped hole therein,
   c) said second edge having an integral upward-extending inverted V-shaped angular arm with a second flat mounting surface displaced from said square base, and said second flat mounting surface having a centered second tapped hole therein,
   d) a hollow screw that is disposed within said square base clearance hole for attachment to a tire inflation valve distal end flange, and
   e) a threaded screw that engages said S-shaped angular arm tapped hole for attachment of a TPMS onto a steel 22.5 inch wheel.

2. The TPMS monitor mounting bracket as recited in claim 1 wherein said flat square base is at least 0.625 inches (1.59 cm) square and has a radial corner at the intersection of the third edge and the fourth edge.

3. The TPMS monitor mounting bracket as recited in claim 1 wherein said first edge integral upward-extending S-shaped angular arm has an angular radius of essentially 0.09 inches (0.24 cm) from the square base first edge to the arm.

4. The TPMS monitor mounting bracket as recited in claim 1 wherein said first edge integral upward-extending S-shaped angular arm has an angular radius of essentially 0.09 inches (0.24 cm) from said arm to said first flat mounting surface.

5. The TPMS monitor mounting bracket as recited in claim 1 wherein said first edge integral upward-extending S-shaped angular arm has an offset angle of essentially 71 degrees between the square base and the S-shaped angular arm.

6. The TPMS monitor mounting bracket as recited in claim 1 wherein said flat square base, said integral upward-extending S-shaped angular arm and said upward-extending inverted V-shaped angular arm are nominally 0.125 inch thick aluminum.

7. A TPMS monitor mounting bracket which comprises:
   a) a flat square base having a first edge, a second edge, a third edge and a fourth edge, with said square base having a centrally located clearance hole therein,
   b) said first edge having an integral upward-extending S-shaped angular arm with a first flat mounting surface on the same horizontal plane but positioned above said square base, and said first flat mounting surface having an essentially centered first tapped hole therein,
   c) said second edge having an integral upward-extending inverted V-shaped angular arm with a second flat mounting surface essentially 87 degrees from said square base, and said second flat mounting surface having an essentially centered second tapped hole therein,
   d) a hollow screw that is disposed within said square base clearance hole for attachment to a tire inflation valve distal end flange, and
   e) a threaded screw that engages said inverted V-shaped angular arm tapped hole for attachment of a TPMS onto an aluminum 22.5 inch wheel.

8. The TPMS monitor mounting bracket as recited in claim 7 wherein said flat square base is no more than 0.625 inches (1.59 cm) square and has a radial corner at the intersection of the third edge and the fourth edge.

9. The TPMS monitor mounting bracket as recited in claim 7 wherein said second edge integral upward-extending V-shaped angular arm has a radius of essentially 0.30 inches (0.08 cm) from said square base second edge to said V-shaped angular arm second flat surface.

10. The TPMS monitor mounting bracket as recited in claim 7 wherein said second edge integral upward-extending V-shaped angular arm has a radius of essentially 0.16 inches (0.41 cm) from said square base second edge to said V-shaped angular arm.

11. The TPMS monitor mounting bracket as recited in claim 7 wherein said second edge integral upward-extending inverted V-shaped angular arm second flat mounting surface is formed essentially 41 degrees from the square base second edge to the V-shaped angular arm.

12. The TPMS monitor mounting bracket as recited in claim 7 wherein said flat square base, said integral upward-extending S-shaped angular arm and said upward-extending inverted V-shaped angular arm are nominally 0.125 inch thick aluminum.

13. A TPMS monitor mounting bracket which comprises:
   a) a flat square base having a first edge, a second edge, a third edge and a fourth edge, with said square base having a centrally located clearance hole therein,
   b) said first edge having an integral upward-extending S-shaped angular arm with a first flat mounting surface on the same horizontal plane but positioned above said square base, and said first flat mounting surface having a centered first tapped hole therein,
   c) said second edge having an integral upward-extending inverted V-shaped angular arm with a second flat mounting surface essentially 87 degrees from said square base, and said second flat mounting surface having a centered second tapped hole therein,
   d) said third edge having an integral right angle arm with a third flat mounting surface 90 degrees from said square base, and said third flat mounting surface having an essentially centered third tapped hole therein,
   e) a hollow screw that is disposed within said square base clearance hole for attachment to a tire inflation valve distal end flange, and
   f) a threaded screw that engages said third edge angular arm tapped hole for attachment of a TPMS onto a 14 inch duplex super single wheel.

14. The TPMS monitor mounting bracket as recited in claim 13 wherein said flat square base is no more than 0.625 inches (1.59 cm) square.

15. The TPMS monitor mounting bracket as recited in claim 13 wherein said third edge integral right angular arm has a minimum bend radius of at least 0.09 inches from the square base third edge to said third flat mounting surface.

16. The TPMS monitor mounting bracket as recited in claim 13 wherein said right angle arm is formed essentially 90 degrees from: the square base third edge to the third flat mounting surface.

17. The TPMS monitor mounting bracket as recited in claim 13 wherein said flat square base, said integral upward-extending S-shaped angular arm, said integral upward-extending inverted V-shaped angular arm, and said integral right angle arm are nominally 0.125 inch thick aluminum.

* * * * *